(12) United States Patent
Nedungadi et al.

(10) Patent No.: US 11,621,943 B1
(45) Date of Patent: Apr. 4, 2023

(54) METHODS AND SYSTEMS FOR AUTOMATIC NETWORK SERVICE CONFIGURATION

(71) Applicant: Nile Global, Inc., San Jose, CA (US)

(72) Inventors: Promode Nedungadi, San Jose, CA (US); Avoy Nanda, Dublin, CA (US); Venu Hemige, San Ramon, CA (US)

(73) Assignee: Nile Global, Inc., San Jose, CA (US)

( * ) Notice: Subject to any disclaimer, the term of this patent is extended or adjusted under 35 U.S.C. 154(b) by 0 days.

(21) Appl. No.: 17/578,361

(22) Filed: Jan. 18, 2022

(51) Int. Cl.
| | |
|---|---|
| H04L 29/08 | (2006.01) |
| H04L 12/24 | (2006.01) |
| H04L 29/12 | (2006.01) |
| H04L 61/5014 | (2022.01) |
| H04L 45/00 | (2022.01) |
| H04L 45/42 | (2022.01) |
| H04L 61/103 | (2022.01) |

(52) U.S. Cl.
CPC .......... *H04L 61/5014* (2022.05); *H04L 45/42* (2013.01); *H04L 45/566* (2013.01); *H04L 61/103* (2013.01)

(58) Field of Classification Search
CPC ... H04L 61/5014; H04L 61/103; H04L 45/42; H04L 45/566
USPC ....................................................... 709/223
See application file for complete search history.

(56) References Cited

U.S. PATENT DOCUMENTS

| | | | |
|---|---|---|---|
| 9,768,870 B2 * | 9/2017 | Miedema | H04L 41/0886 |
| 10,938,855 B1 * | 3/2021 | Waldie | G06F 21/575 |
| 10,999,379 B1 * | 5/2021 | Galrani | H04L 67/10 |
| 2003/0133450 A1 * | 7/2003 | Baum | H04L 61/4557 |
| | | | 370/389 |
| 2004/0111640 A1 * | 6/2004 | Baum | H04L 63/1408 |
| | | | 709/224 |
| 2009/0077206 A1 | 3/2009 | Dunn et al. | |
| 2010/0287266 A1 * | 11/2010 | Asati | H04L 41/0823 |
| | | | 709/222 |
| 2016/0285681 A1 | 9/2016 | Kreet et al. | |
| 2021/0184930 A1 | 6/2021 | Mutnuru et al. | |
| 2021/0297409 A1 * | 9/2021 | Rahn | H04L 69/167 |
| 2022/0086040 A1 * | 3/2022 | Narayanan | H04L 12/4645 |

OTHER PUBLICATIONS

Edward Yardley, "How to Configure DHCP Snooping?", Aug. 2012, router-switch, https://blog.router-switch.com/2012/08/how-to-configure-dhcp-snooping/ (Year: 2012).*

Steve Petryschuk, "What is an ARP Table?", Apr. 2021, Auvik, https://www.auvik.com/franklyit/blog/what-is-an-arp-table/ (Year: 2021).*

(Continued)

*Primary Examiner* — Ruolei Zong

(74) *Attorney, Agent, or Firm* — Loza & Loza, LLP

(57) ABSTRACT

Embodiments of a device and method are disclosed. In an embodiment, a method for automatic network service configuration involves using a packet manager of a switch in a network, receiving a packet containing dynamic host configuration protocol (DHCP) request information from a network device in the network, and using the packet manager of the switch in the network, obtaining routing configuration and Address Resolution Protocol (ARP) configuration of the network device in response to the packet containing the DHCP request information.

16 Claims, 12 Drawing Sheets

(56) References Cited

OTHER PUBLICATIONS

Yuri Demchenko, et al., "Enabling Automated Network Services Provisioning for Cloud Based Applications Using Zero Touch Provisioning", Dec. 2015, 2015 IEEE/ACM 8th International Conference on Utility and Cloud Computing (UCC), https://ieeexplore.ieee.org/document/7431457 (Year: 2015).*

Unknown, "Techniques for Zero Touch Provisioning Over Numbered Interfaces", May 2017, IP.com, https://priorart.ip.com/IPCOM/000250018 (Year: 2017).*

* cited by examiner

METHODS AND SYSTEMS FOR AUTOMATIC NETWORK SERVICE CONFIGURATION

BACKGROUND

Growing adoption of enterprise networks allows enterprises to increase network coverage and functionality. Network deployment, for example, enterprise network deployment, at a customer site typically involves a manual and lengthy process, which can take several weeks to months. For example, network deployment usually includes physically racking and stacking of network devices, connecting the network devices according to a planned network topology and manually configuring the network devices and initiating network services for the network devices by a network expert (e.g., a network administrator). However, manually configuring network devices and initiating network services for the network devices is both time consuming and error prone. In addition, getting a network expert (e.g., a network administrator) on-site requires additional time, which can prolong the network deployment process. At some customer sites (e.g., small offices and branches), it may be hard to find a network expert (e.g., a network administrator) to perform network device configuration functions. Therefore, there is a need for network technology that can efficiently configure network services for network devices of an enterprise network once the network devices are physically racked and connected according to a network topology.

SUMMARY

Embodiments of a device and method are disclosed. In an embodiment, a method for automatic network service configuration involves using a packet manager of a switch in a network, receiving a packet containing dynamic host configuration protocol (DHCP) request information from a network device in the network, and using the packet manager of the switch in the network, obtaining routing configuration and Address Resolution Protocol (ARP) configuration of the network device in response to the packet containing the DHCP request information. Other embodiments are also described.

In an embodiment, the switch includes an access switch (AS).

In an embodiment, the method further includes using the packet manager of the switch in the network, determining that the network device is located downstream to the switch in the network.

In an embodiment, the network device is connected to a cloud server through the switch.

In an embodiment, the method further includes using the packet manager of the switch in the network, relaying the packet containing the DHCP request information to a DHCP server.

In an embodiment, the DHCP server is located in a distribution switch (DS) of the network.

In an embodiment, the method further includes using the packet manager of the switch in the network, receiving an acknowledgement packet for the network device from the DHCP server.

In an embodiment, using the packet manager of the switch in the network, obtaining the routing configuration and the ARP configuration of the network device in response to the packet containing the DHCP request information includes using the packet manager of the switch in the network, configuring a static route and a static ARP entry in hardware for the network device.

In an embodiment, the method further includes using the packet manager of the switch in the network, receiving a second packet containing ARP request information from a second network device in the network.

In an embodiment, the method further includes using the packet manager of the switch in the network, configuring a static route and a static ARP entry in hardware for the second network device in response to the second packet containing the ARP request information.

In an embodiment, the method further includes using the packet manager of the switch in the network, configuring a static route and a static ARP entry in hardware for the second network device without relaying the second packet to a DHCP server.

In an embodiment, using the packet manager of the switch in the network, receiving the packet containing the DHCP request information from the network device in the network includes using a first thread of the packet manager, receiving the packet containing the DHCP request information from the network device in the network, and using the packet manager of the switch in the network, receiving the second packet containing the ARP request information from the second network device in the network includes using a second thread of the packet manager, receiving the second packet containing the ARP request information from the second network device in the network.

In an embodiment, a method for automatic network service configuration involves using a packet manager of a switch in a network, receiving a packet containing DHCP request information or ARP request information from a network device in the network, and, using the packet manager of the switch in the network, configuring a static route and a static ARP entry in hardware for the network device in response to the packet containing the DHCP request information or the ARP request information.

In an embodiment, the switch includes an access switch (AS).

In an embodiment, the method further includes using the packet manager of the switch in the network, determining that the network device is located downstream to the switch in the network.

In an embodiment, the network device is connected to a cloud server through the switch.

In an embodiment, the network device includes a gateway, a wireless access point, or a sensor.

In an embodiment, the method further includes when the packet contains the DHCP request information, using the packet manager of the switch in the network, relaying the packet to a DHCP server.

In an embodiment, the DHCP server is located in a DS of the network.

In an embodiment, a method for automatic network service configuration involves enabling a network interface of an AS, performing a link layer discovery protocol (LLDP) operation to discover a DS connected to the network interface starting a DHCP client on the network interface, and using the DHCP client, receiving DHCP configuration from a DHCP server to configure the network interface.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
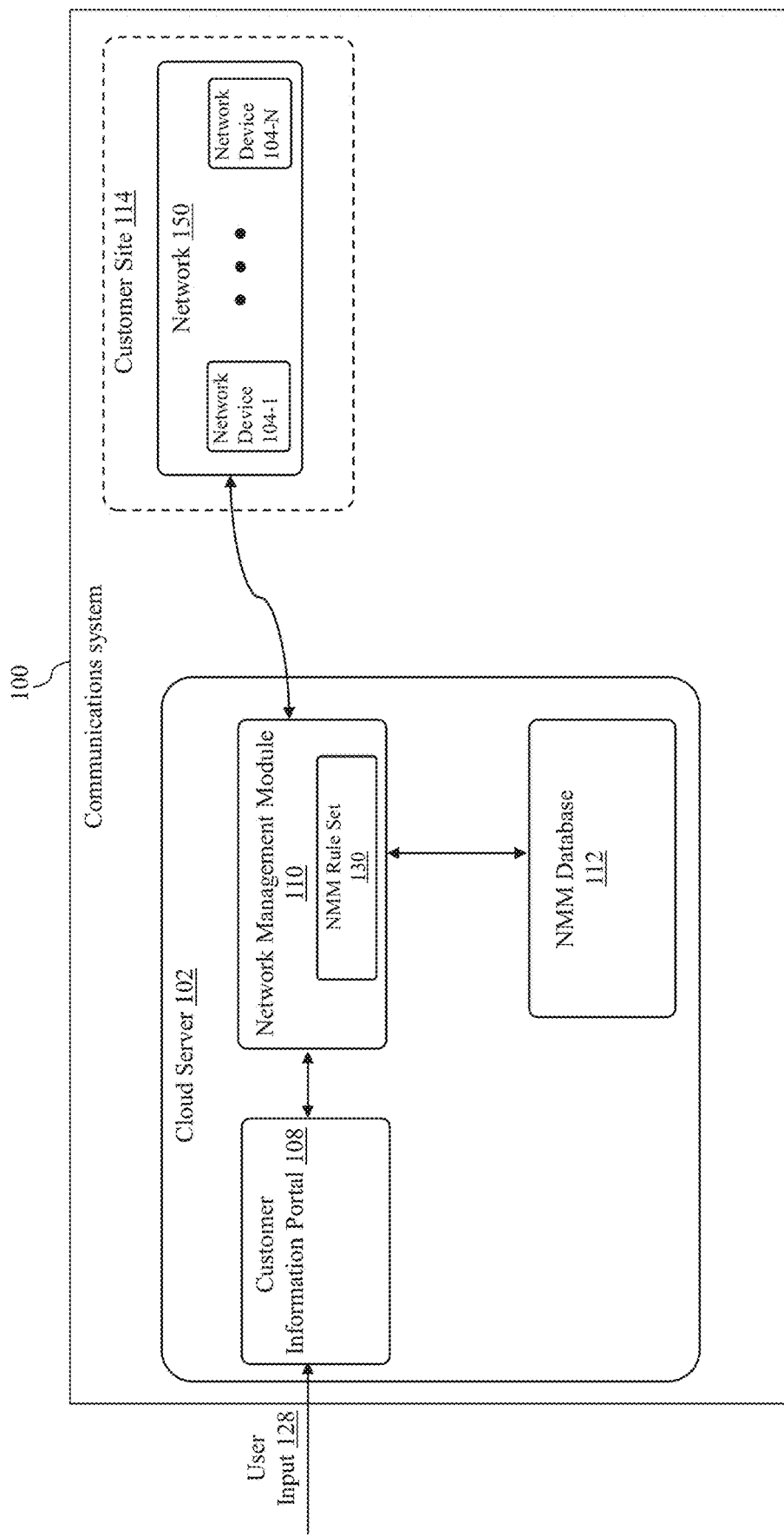
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and at least one deployed network 150 within a customer site 114. The cloud server and/or the deployed network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a network management service (e.g., a device configuration service) to network devices (e.g., the deployed network 150) at the customer site. Because the cloud server can facilitate or perform a network management service or operation for network devices at the customer site, network management efficiency can be improved. In addition, because the cloud server can facilitate or perform a network management service or operation for network devices at the customer site, a user or customer of the customer site can be notified of a device and/or network outage. Consequently, device and/or network outage time can be reduced. In some embodiments, the cloud server is configured to generate a user interface to obtain input information, for example, a floor plan of a customer site. In some embodiments, the user interface includes a graphical user interface. The cloud server may be implemented in hardware (e.g., circuits), software, firmware, or a combination thereof. In some embodiments, the cloud server is hosted or executed in a public cloud computing environment such as Amazon Web Services (AWS), and/or a private cloud computing environment such as an enterprise cloud server. In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes a network management module (NMM) 110, a customer information portal 108 connected to the NMM module 110, and an NMM database 112 configured to store NMM data. The NMM module, the customer information portal, and/or the NMM database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one NMM module, more than one customer information portal, and/or more than one NMM database. In another example, although the NMM module, the customer information portal, and the NMM database are shown in FIG. 1 as being connected in a certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server. In some embodiments, the NMM module 110 is configured to facilitate or perform an NMM service (e.g., a device configuration service) to network devices (e.g., the deployed network 150) at the customer site 114, for example, using an NMM rule set 130. The NMM rule set 130 may include one or more NMM rules (e.g., device configuration rules) for network devices at the customer site 114, for example, for performing an NMM service (e.g., a device configuration service) to network devices at the customer site 114. In some embodiments, the NMM module 110 is configured to generate and/or transmit at least one alert (e.g., a device outage alert or a network throughput alert) regarding a network deployed and/or to be deployed at the customer site or a network operator site, for example, to an administrator or a user or customer (e.g., a layperson such as a worker on-site or an end-user such as an employee) at the customer site 114. In some embodiments, the NMM database 112 is configured to store NMM data for a network deployed and/or to be deployed at the customer site (e.g., a list of network devices deployed or to be deployed at the customer site). In some embodiments, the NMM database 112 is configured to store the at least one NMM alert. Because the NMM module can facilitate or perform network diagnostic for network devices at the customer site, network diagnostic efficiency can be improved. In addition, because the NMM deployment module can facilitate or perform a network management service or operation for network devices at the customer site, an administrator or a customer can be notified of device and/or network conditions or outages. Consequently, device and/or network outage or low performance time can be shortened. The customer information portal 108 is configured to receive user input 128. In some embodiments, the customer information portal is configured to include or generate a user interface that allows a customer to input information related to the customer site 114 (e.g., the floor plan of the customer site 114) and/or information associated with an NMM service for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the one or more network devices 104-1, . . . , 104-N is compatible with Institute of Electrical and Electronics Engineers (IEEE) 802.3 protocol and/or one or more wireless local area network (WLAN) communications protocols, such as IEEE 802.11 protocol, and/or a short-range communications protocol, such as Bluetooth. In some embodiments, at least one of the one or more network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the one or more network devices 104-1, . . . , 104-N is a wireless station (STA) that wirelessly connects to a wireless AP. For example, at least one of the one or more network devices 104-1, . . . , 104-N may be a laptop, a desktop personal computer (PC), a mobile phone, or other wireless device that supports at least one WLAN communications protocol (e.g., an IEEE 802.11 protocol)).

Figure 2:
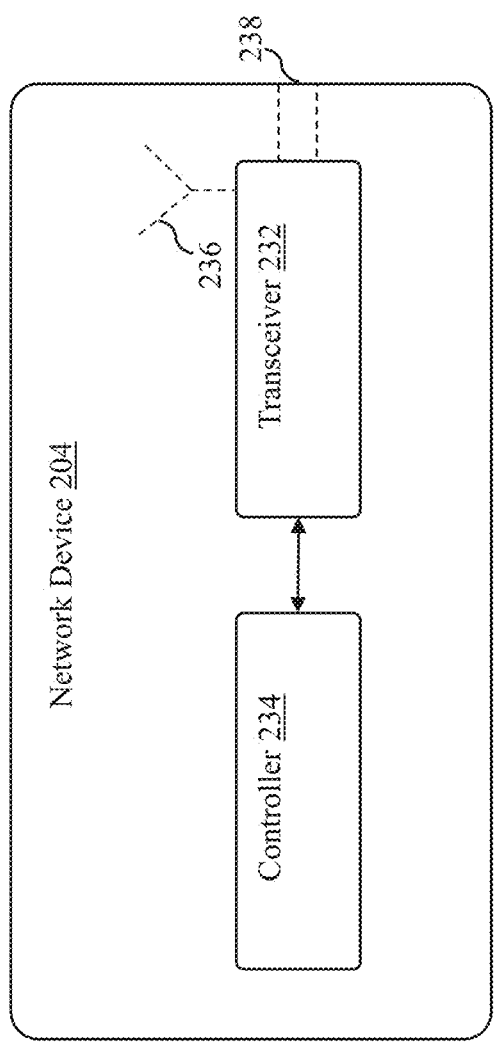
FIG. 2 depicts an embodiment of a network device of the communications system depicted in FIG. 1.

FIG. 2 depicts an embodiment of a network device 204 of the communications system 100 depicted in FIG. 1. The network device 204 may be an embodiment of a network device 104-1, . . . , or 104-N that is included in the deployed network 150 in FIG. 1. However, network devices 104-1, . . . , 104-N that can be included in the deployed network 150 depicted in FIG. 1 are not limited to the embodiment depicted in FIG. 2. The network device 204 may be any suitable type of network device. For example, the network device 204 may be a distribution switch (DS), a gateway, an access switch (AS), a wireless access point (AP), a STA, or a sensor. In the embodiment depicted in FIG. 2, a network device 204 includes at least one wireless and/or wired transceiver 232, at least one optional antenna 236 operably connected to the transceiver 232-1, at least one optional network port 238 operably connected to the transceiver 232, and a controller 234 operably connected to the transceiver 232. In some embodiments, the transceiver 232 includes a physical layer (PHY) device. The transceivers 232 may be any suitable type of transceiver. For example, the transceiver 232 may be a short-range communications transceiver (e.g., a Bluetooth or Bluetooth Low Energy (BLE) transceiver) or a WLAN transceiver (e.g., a transceiver compatible with an IEEE 802.11 protocol). In some embodiments, the network device 204 includes multiple transceivers, for example, a short-range communications transceiver (e.g., a Bluetooth or BLE transceiver) and a WLAN transceiver (e.g., a transceiver compatible with an IEEE 802.11 protocol). For example, the network device 204 includes a WLAN transceiver (e.g., a transceiver compatible with an IEEE 802.11 protocol) and a short-range communications transceiver (e.g., a Bluetooth or BLE transceiver). In some embodiments, the network device (e.g., a wireless AP) includes multiple antennas and multiple wireless transceivers that share the antennas. In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to obtain and/or store network information relevant to the network device 204. For example, the controller 234 may be configured to obtain and/or store network information (e.g., routing information such as a routing table) relevant to the network device 204. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. Although the illustrated network device 204 is shown with certain components and described with certain functionality herein, other embodiments of the network device 204 may include fewer or more components to implement the same, less, or more functionality. For example, in some embodiments, the network device 204 includes the at least one antenna 236 but no network port. In another example, in some embodiments, the network device 204 includes the at least one network port 238 but no antenna.

Figure 3:
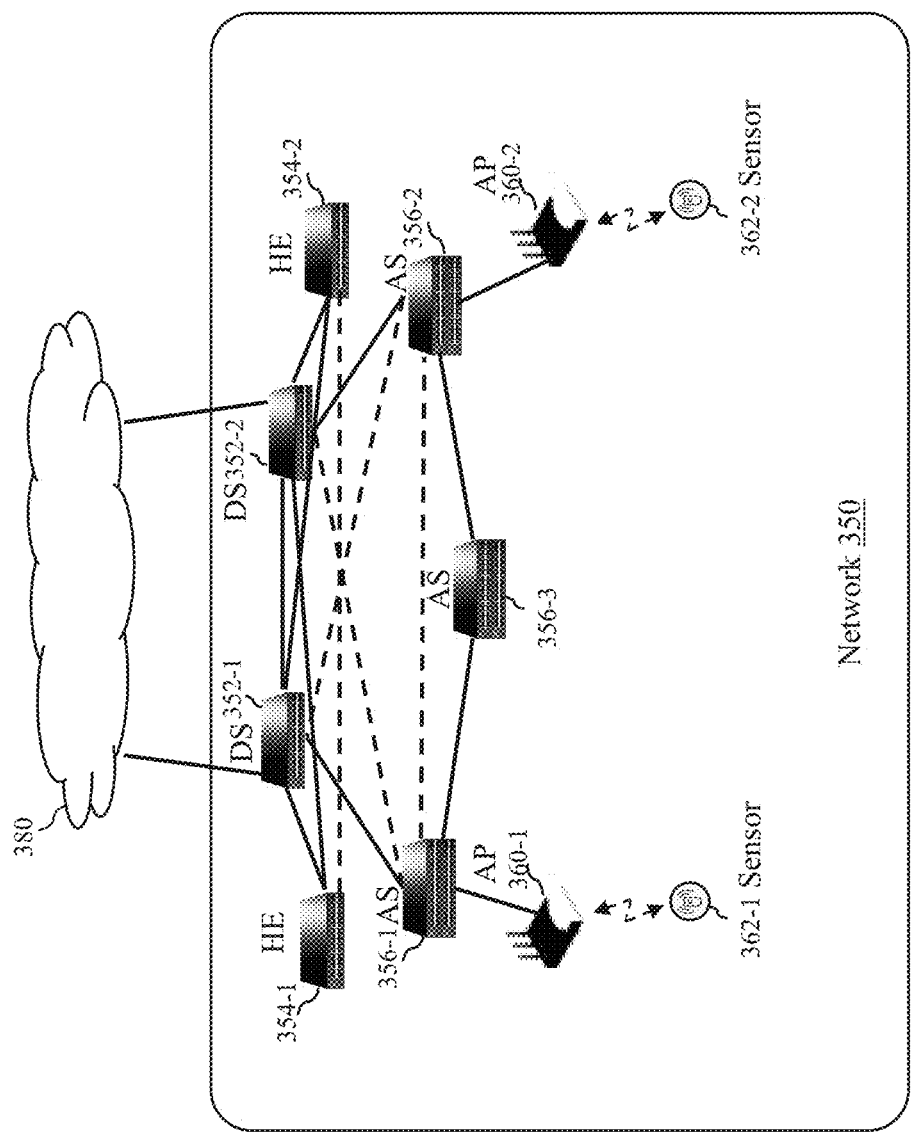
FIG. 3 depicts a network that can be included in the communications system depicted in FIG. 1.

FIG. 3 depicts a network 350 that can be included in the communications system 100 depicted in FIG. 1. The network 350 depicted in FIG. 3 is an embodiment of the network 150 depicted in FIG. 1. However, the network 150 depicted in FIG. 1 is not limited to the embodiment depicted in FIG. 3. In the embodiment depicted in FIG. 3, the network 350 includes a pair of distribution switches (DSs) or distribution layer switches 352-1, 352-2 that are aggregation switches functioning as a bridge between core layer switches and access layer switches, a pair of head ends (HEs) or gateways 354-1, 354-2, a number of access switches (ASs) 356-1, 356-2, 356-3 that directly interact with lower level devices (e.g., wireless APs), a number of wireless APs 360-1, 360-2 connected to the ASs, and a number of wireless sensors 362-1, 362-2 that wirelessly connect to the wireless APs. The DSs 352-1, 352-2 are connected to a network 380 (e.g., the Internet), which is connected to a network management module (e.g., the network management module 110 of the cloud server 102 depicted in FIG. 1). In some embodiments, the network 350 constitutes a network service block (NSB), which is a basic building block for providing connectivity as a service and is a replicable block that can be scaled (e.g., expanded) to meet any deployment. Although the network 350 is shown with certain components and described with certain functionality herein, other embodiments of the network 350 may include fewer or more components to implement the same, less, or more functionality. For example, in some embodiments, the network 350 includes only one DS, more than two DSs, no HE, only one HE, more than two HEs, less than three ASs, more than three ASs, less than two wireless APs, more than two wireless APs, less than two wireless sensors, more than two wireless sensors, and/or one or more wireless/wired STAs. In another example, the network 350 includes one or more wired and/or wireless devices, for example, laptops, desktop personal computers (PCs), mobile phones, and/or cameras. In another example, although the network 350 shown in FIG. 3 as being connected in certain topology, the network topology of the network 350 is not limited to the topology shown in FIG. 3. In some embodiments, the number of HEs and DSs is constant in the network 350 while the number of the wireless APs, the aSs and the sensor(s) in the network 350 varies.

Figure 4:
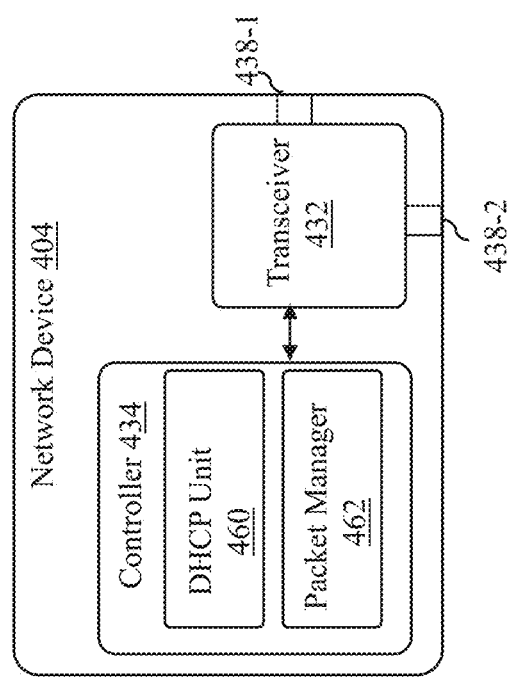
FIG. 4 depicts an embodiment of a network device in the network depicted in FIG. 3.

FIG. 4 depicts a network device 404, which is an embodiment of the DSs 352-1, 352-2, the HEs 354-1, 354-2, the aSs 356-1, 356-2, 356-3, the wireless APs 360-1, 360-2, and the wireless sensors 362-1, 362-2 of the network 350 depicted in FIG. 3. However, the DSs 352-1, 352-2, the HEs 354-1, 354-2, the aSs 356-1, 356-2, 356-3, the wireless APs 360-1, 360-2, and the wireless sensors 362-1, 362-2 depicted in FIG. 3 are not limited to the embodiment depicted in FIG. 4. In the embodiment depicted in FIG. 4, the network device 404 includes at least one wireless and/or wired transceiver 432, two network ports 438-1, 438-2 operably connected to the transceiver 432, and a controller 434 operably connected to the transceiver 432. In some embodiments, the transceiver 432 includes a physical layer (PHY) device. The transceiver 432 may be any suitable type of transceiver. For example, the transceiver 432 may be a LAN (e.g., Ethernet) transceiver. In some embodiments, the network device 404 includes multiple transceivers. The network ports 438-1, 438-2 may be any suitable type of ports. For example, the network ports 438-1, 438-2 may be LAN network ports such as Ethernet ports. However, the network ports 438-1, 438-2 are not limited to LAN network ports. In some embodiments, the network device 404 includes one or more antennas. In some embodiments, the controller 434 is configured to control the transceiver 432 to process packets received through the network ports 438-1, 438-2 and/or to generate outgoing packets to be transmitted through the network ports 438-1, 438-2. In some embodiments, the controller 434 is configured to obtain and/or store network information relevant to the network device 404. For example, the controller 434 may be configured to obtain and/or store network information (e.g., routing information such as a routing table) relevant to the network device 404. In the embodiment depicted in FIG. 4, the network device 404 (e.g., the controller 434) includes a Dynamic Host Control Protocol (DHCP) unit 460 configured to perform DHCP functions and a packet manager 462 configured to perform packet management functions. In some embodiments, the network device 404 includes a processor (e.g., a microcontroller, a DSP, and/or a CPU), and memory that may store information (e.g., an operation system (OS)) for the processor. In these embodiments, the controller 434 (e.g., the DHCP unit 460 and the packet manager 462) are implemented using the processor and the memory. Although the network device 404 is shown with certain components and described with certain functionality herein, other embodiments of the network device 404 may include fewer or more components to implement the same, less, or more functionality. For example, in some embodiments, the network device 404 includes a different number of network ports.

Figure 5:
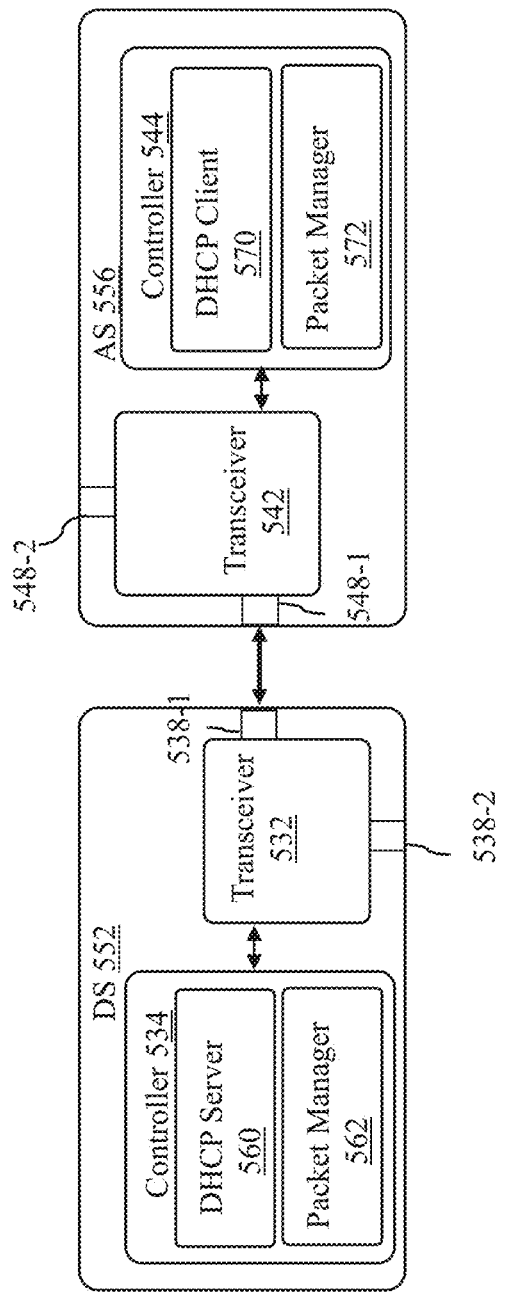
FIG. 5 depicts a distribution switch (DS) and a corresponding access switch (AS), which are embodiments of the network device depicted in FIG. 4.

FIG. 5 depicts a DS 552 and a corresponding AS 556, which are embodiments of the network device 404 depicted in FIG. 4. In the embodiment depicted in FIG. 5, the DS 552 includes at least one wired transceiver 532, two network ports 538-1, 538-2 operably connected to the transceiver 532, and a controller 534 operably connected to the transceiver 532, while the AS 556 includes at least one wired transceiver 542, two network ports 548-1, 548-2 operably connected to the transceiver 542, and a controller 544 operably connected to the transceiver 532. In the embodiment depicted in FIG. 5, the network port 538-1 of the DS 552 is connected to the network port 548-1 of the AS 556 by, for example, an Ethernet cable. The controller 534 of the DS 552 includes a DHCP server 560 configured to perform DHCP server functions and a packet manager 562 configured to perform packet management functions. In some embodiments, at least one of the DHCP server 560 and the packet manager 562 is implemented in software executed by the controller 534. The controller 544 of the AS 556 includes a DHCP client 570 configured to perform DHCP client functions and a packet manager 572 configured to perform packet management functions. In some embodiments, at least one of the DHCP client 570 and the packet manager 572 is implemented in software executed by the controller 544. In some embodiments, the DS 552 and/or the AS 556 includes a processor (e.g., a microcontroller, a DSP, and/or a CPU), and memory that may store information (e.g., an operation system (OS)) for the processor. Although the DS 552 and the AS 556 are shown with certain components and described with certain functionality herein, other embodiments of the DS 552 and the AS 556 may include fewer or more components to implement the same, less, or more functionality. For example, in some embodiments, the DS 552 and/or the AS 556 includes a different number of network ports. In another example, although the components of the DS 552 and/or the AS 556 are shown in FIG. 5 as being connected in certain topology, the network topology of the DS 552 and/or the AS 556 is not limited to the topology shown in FIG. 5.

The DS 552 is initialized first with network configuration (e.g., IP address, DNS settings, and/or routing settings). After the DS 552 is initialized, the DS 552 starts its DHCP server 560 to allocate Internet Protocol (IP) addresses and to provide basic configuration, such as, Domain Name System (DNS) servers, network time protocol (NTP) servers, cloud fully qualified domain names (FQDNs) and HE IPs. When the AS 556 starts up, the AS 556 enables all the interfaces by default and starts LLDP to discover any DS it is connected to. After discovering the DS 552, the AS 556 starts its DHCP client 570 on that interface and initiates Discover, Offer, Request and Acknowledge (DORA) steps to receive DHCP information from the DS 552. After the AS 556 receives DHCP information from the DS 552, the AS 556 configures itself by making all the interfaces as Layer 3 (L3 or the network layer of the Open Systems Interconnection (OSI) model) with an assigned IP address configured on one loopback interface. The AS 556 sets up DNS, NTP and enables Open Shortest Path First (OSPF) on the interfaces where the AS 556 discovers another DS. With this configuration, the AS 556 can now reach the cloud server 102 via the DS 552. After the AS 556 completes its initialization, the AS 556 starts its packet manager (PktMgr) 572 that works as a broker. In some embodiments, the packet manager 572 receives DHCP and ARP packets from downstream NEs. DHCP packets from downstream network elements (NEs) such as subsequent AS(s), wireless AP(s), STA(s), sensor(s), are relayed by the AS 552 to the DS 556. In some embodiments, DHCP packets are DHCPDISCOVER packets or DHCPREQUEST packets. When an ACK is received for an NE for which the packet manager 572 relays DHCP packets, the packet manager 572 may configure a static route and a static ARP entry in hardware (HW). The HW may be application-specific integrated circuit (ASIC), memory (e.g., a RAM) or other storage device, such as, a hard drive disk or a flash storage device. In some embodiments, the HW is included in the AS 556, for example, within or attached to the controller 544 of the AS 556, which may be a processor (e.g., a microcontroller, a DSP, and/or a CPU)). These static entries allow the downstream NE to receiver and/or transmit packets to other NEs as well as the cloud server 102. In some embodiments, the packet manager 572 only relays DHCP packets from HEs, APs and sensors. The packet manager 572 may examine the corresponding DHCP relay option (opt)-60 value that NEs fill in when sending DHCP packets. The packet manager 572 may also receive and process ARP packets (e.g., gratuitous ARP (grat-ARP) packets) from downstream NEs. When the packet manager 572 receives a grat-ARP from a downstream NE, the NE already has IP and goes through some restart or re-initialization process. In that case, instead of waiting for DHCP steps to happen, the packet manager 572 adds a static route and an ARP entry in HW for that NE. The HW may be ASIC, memory (e.g., a random-access memory (RAM)) or other storage device, such as, a hard drive disk or a flash storage device. In some embodiments, the HW is included in the AS 556, for example, within or attached to the controller 544 of the AS 556, which may be a processor (e.g., a microcontroller, a DSP, and/or a CPU)). All the NEs can start sending periodic grat-ARP packets after they have received an IP address. In some embodiments, a packet manager runs on every switch (DS or AS) and relays DHCP packets to DHCP servers running on DSs.

Figure 6:
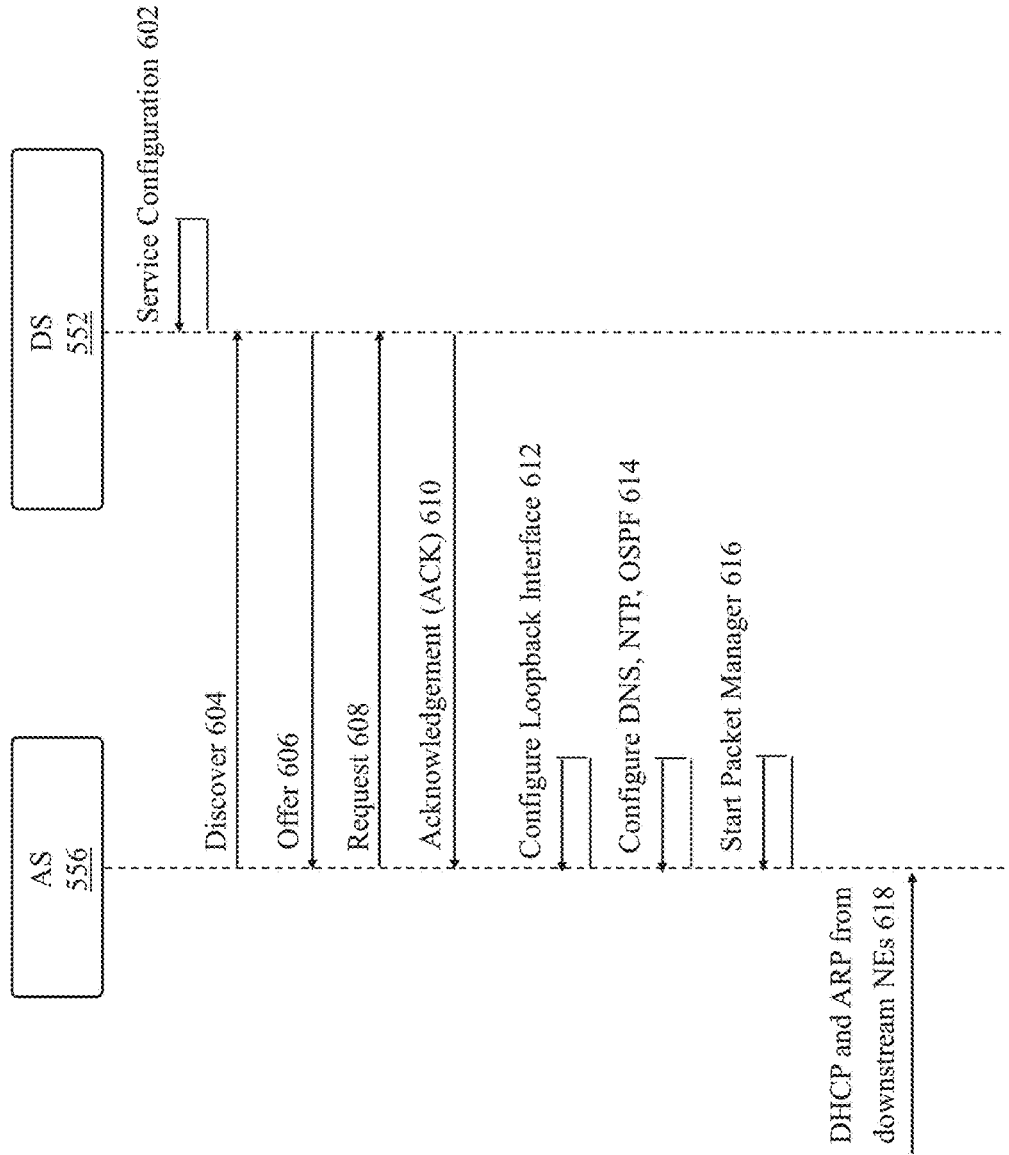
FIG. 6 shows a swim-lane diagram illustrating an example activation procedure between the AS and the DS depicted in FIG. 5.

FIG. 6 shows a swim-lane diagram illustrating an example packet manager activation procedure between the AS 556 and the DS 552 depicted in FIG. 5. In operation 602, the DS 552 performs service configuration. In operation 604, the AS 556 starts off with sending a discover request to the DS 552, which sends an offer back to the AS 556 in operation 606. In operation 608, the AS 556 sends a request to the DS 552, which sends an acknowledgement (ACK) back to the AS 556 in operation 610. After the AS 556 receives the ACK, the AS 556 configures a loopback interface in operation 612, configures services (e.g., DNS, NTP, Open Shortest Path First (OSPF) services) in operation 614, and starts its packet manager 572 in operation 616, which makes the AS 556 ready to accept DHCP and Address Resolution Protocol (ARP) messages from downstream NEs (e.g., subsequent AS(s), wireless AP(s), STA(s), sensor(s)). In operation 618, DHCP and ARP messages from downstream NEs are received at the AS 556, which can forward these messages to other network element such as the DS 552. Although operations in the example procedure in FIG. 6 are described in a particular order, in some embodiments, the order of the operations in the example procedure may be altered so that certain operations may be performed in an inverse order or so that certain operations may be performed, at least in part, concurrently with other operations.

Figure 7:
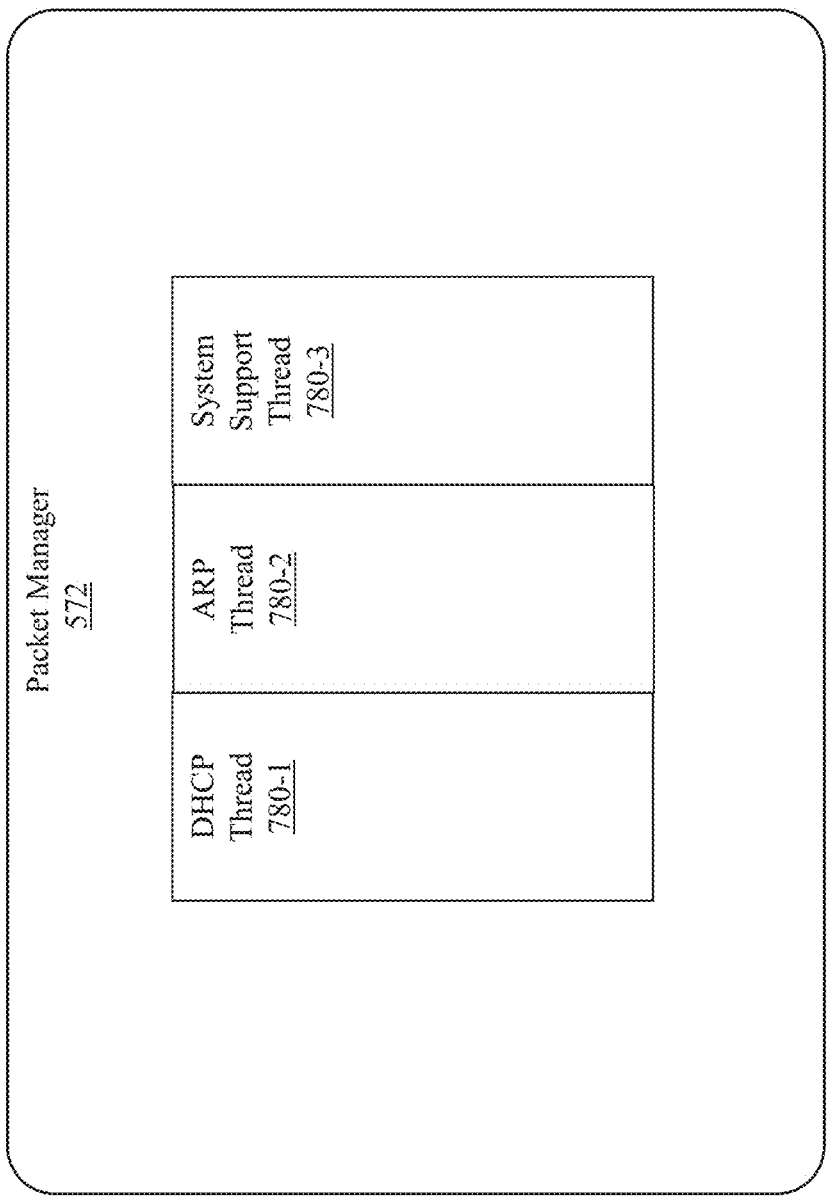
FIG. 7 depicts a thread diagram of a packet manager of the AS depicted in FIG. 5.

FIG. 7 depicts a thread diagram of the packet manager 572 of the AS 556 depicted in FIG. 5. In the embodiment depicted in FIG. 7, the packet manager 572 establishes a DHCP thread 780-1, an ARP thread 780-2, and a system support thread 780-3. Each of the DHCP thread 780-1, the ARP thread 780-2, and the system support thread 780-3 listens to packets on interfaces and processes. In some embodiments, a thread is a basic ordered sequence of instructions that can be passed through or processed by a single CPU core. In some embodiments, a thread corresponds to a physical CPU or core. For example, a three core CPU can support three hardware threads at once, which means that the CPU can perform three different tasks at the same time.

The DHCP operation of the packet manager 572 of the AS 556 may be implemented using different algorithms. A pseudo-code for a particular implementation of the DHCP operation in accordance with an embodiment of the invention is shown below.

```
DHCP
Start socket to receive packets from interface
    if a received DHCP packet is valid
        get DHCP type
            get opt60 value
                if from NE
                    relay to DHCP server
                if not from NE
                    ask cloud server to convert this port to wired client
                get incoming interface
                    store interface information in database for
forwarding DHCP response to
            client
        if the DHCP packet is ACK,
            add route to client,
            add ARP to client,
        if the DHCP packet is from an existing client,
            refresh the client.
```

The algorithm defined by the above pseudo-code is similar to or identical with the operation described below with respect to the process flow diagram of FIG. 8. Specifically, FIG. 8 is a flow diagram of a DHCP operation of the packet manager 572 of the AS 556 depicted in FIG. 5 in accordance with an embodiment of the invention.

Figure 8:
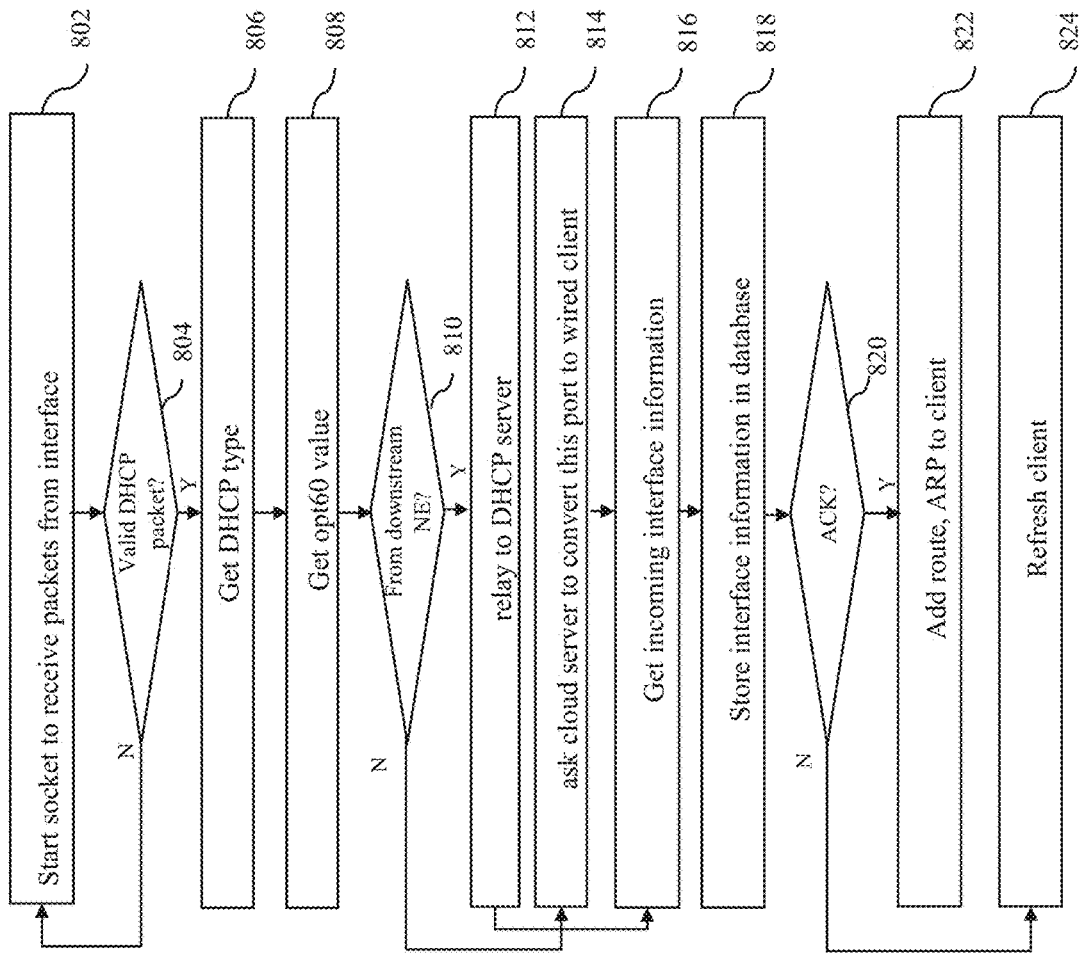
FIG. 8 is a flow diagram of a DHCP operation of the packet manager of the AS depicted in FIG. 5 in accordance with an embodiment of the invention.

As illustrated in FIG. 8, the DHCP operation begins at block 802, the packet manager 572 of the AS 556 starts sockets (e.g., Linux interface/sockets) to receive packets from a network interface. The network interface may be one or more network adapters, also referred to as a Network Interface Card (NIC). Next at block 804, a determination is made whether a received packet is a valid DHCP packet. If not, then the operation goes back block 802. If yes, then the operation proceeds to block 806, where the packet manager 572 gets or obtains a DHCP type of the received DHCP packet. Next, at block 808, the packet manager 572 gets or obtains an opt60 value of the received DHCP packet.

Next at block 810, a determination is made whether the packet is received from a downstream NE (e.g., a subsequent AS, a wireless AP, a STA, or a sensor). In some embodiments, a determination is made whether the packet is received from a downstream NE based on the option-60 value in the DHCP packet. For example, option-60 values can be NileAP-Wifi6 for an Access Point (AP), NileHeadEnd for a HeadEnd (HE), NileSwitch for an Access Switch (AS), or NileSensor-Wifi5 for a Sensor (SE). In another example, other option-60 values are used for APs, HEs, ASs, and/or SEs. If yes, then the operation proceeds to block 812, where the packet manager 572 relays the received DHCP packet to a DHCP server (e.g., the DHCP server 560 of the DS 552 depicted in FIG. 5). In some embodiments, the received DHCP packet is a DHCPDISCOVER packet or a DHCPREQUEST packet. In some embodiments, the received DHCP packet includes an operation code or a Bootstrap Protocol (BOOTP) code that specifies the general type of the packet, a network hardware type data field that specifies the type of hardware used for a local network, a transaction identifier data field for matching a request with replies received from DHCP servers, one or more network address data fields (e.g., origin and destination addresses), a client hardware address data filed (e.g., MAC address) for identification, and/or a DHCP option data shield. For example, for the operation code, a value of 1 indicates a request message, while a value of 2 is a reply message. In another example, the BOOTP code for BOOTPREQUEST in the header is 1, and the BOOTP code for BOOTREPLY in the header is 2. If not, then the operation proceeds to block 814, where the packet manager 572 asks the cloud server 102 to convert this port to a wired client interface. In some embodiments, the packet manager 572 converts the interface to a wired client interface based on a corresponding option-60 value in the DHCP packet. If the option-60 value in a DHCP header does not contain any value matching a predefined value of an AP, an AS, a HE or a SE, the packet manager 572 converts that interface to a wired-client interface. By conversion, the packet manager 572 establishes the interface as an L2 interface and configures that interface as an attachment circuit in a Network Virtualization using Generic Routing Encapsulation (NVGRE) tenant, which can tunnel all traffic from that interface on an AS to a HE. Subsequently, at block 816, the packet manager 572 gets or obtains incoming interface information. At block 818, the packet manager 572 stores the interface information in a database.

Next at block 820, a determination is made whether the received packet is an acknowledgement (ACK) packet for a particular network device. If yes, then the operation proceeds to block 822, where the packet manager 572 adds a static route and ARP information for a corresponding client (e.g., the particular network device for which the ACK packet is received). If not, then the operation proceeds to block 824, where the packet manager 572 refreshes information for a corresponding client (e.g., the particular network device for which the ACK packet is received). In some embodiments, the packet manager 572 runs a timer on every client the packet manager 572 discovers via DHCP or grat-ARP. Upon receipt of a message from that client, the timer is refreshed. For example, this timer may be running for 90 seconds, while grat-ARP from the client is received every 30 seconds. If the timer expires, that client is assumed to be lost or malfunctioned and the corresponding static route and ARP entries are deleted from a forwarding plane. Each NE can start sending grat-ARP every 30 seconds after the NE receives an IP allocated via DHCP.

The ARP operation of the packet manager 572 of the AS 556 may be implemented using different algorithms. A pseudo-code for a particular implementation of the ARP operation in accordance with an embodiment of the invention is shown below.

```
ARP
  This is to support client restart when a grat-ARP is received.
    Refresh timer to make sure the client is maintained active,
      if the client does not exist,
        add a new client,
        add static route to the client,
        add static ARP to the client.
```

The algorithm defined by the above pseudo-code is similar to or identical with the operation described below with respect to the process flow diagram of FIG. 9. Specifically, FIG. 9 is a flow diagram of an ARP operation of the packet manager 572 of the AS 556 depicted in FIG. 5 in accordance with an embodiment of the invention.

Figure 9:
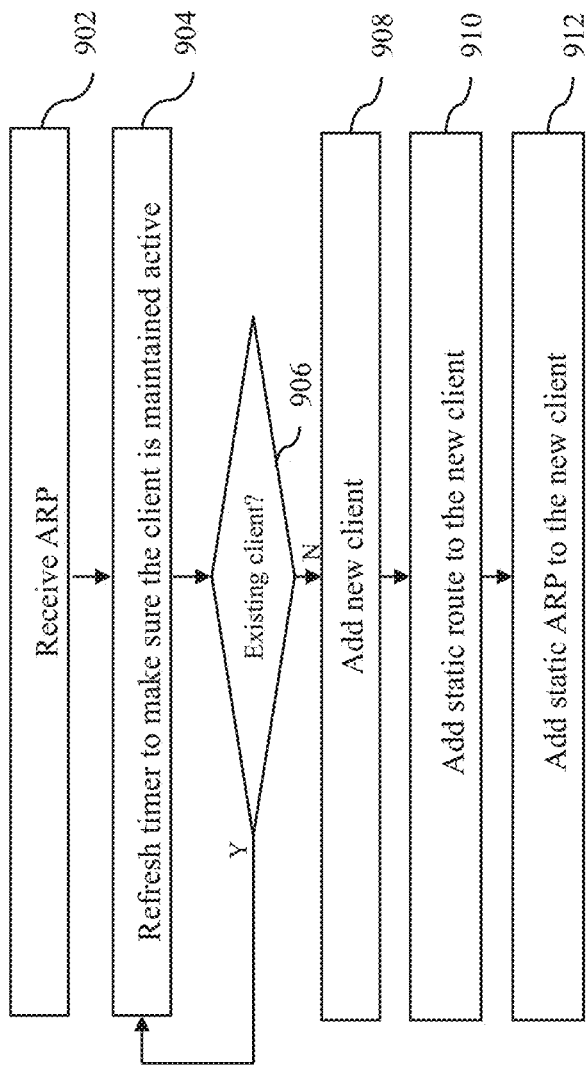
FIG. 9 is a flow diagram of an ARP operation of the packet manager of the AS depicted in FIG. 5 in accordance with an embodiment of the invention.

As illustrated in FIG. 9, the ARP operation begins at block 902, the packet manager 572 of the AS 556 receives ARP request information from a particular network device. Next at block 904, the packet manager 572 refreshes a timer to make sure a corresponding client (e.g., the particular network device from which the ARP request information is received) is maintained active. At block 906, a determination is made whether the client (e.g., the particular network device from which the ARP request information is received) is an existing client. If yes, then the operation goes back block 904. If not, then the operation proceeds to block 908, where the packet manager 572 adds a new client (e.g., add a new network device in a database associated with the AS 556). At block 910, the packet manager 572 adds a static route to the new client. At block 912, the packet manager 572 adds a static ARP to the new client.

Figure 10:
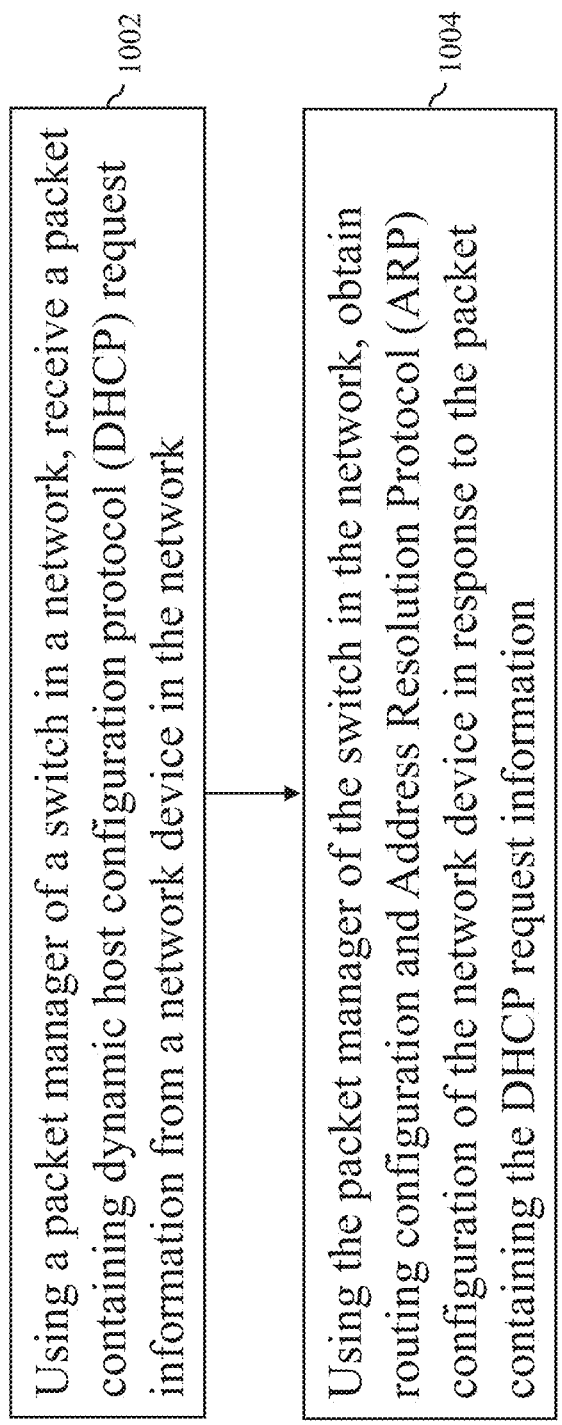
FIG. 10 is a process flow diagram of a method for automatic network service configuration in accordance to an embodiment of the invention.

FIG. 10 is a process flow diagram of a method for automatic network service configuration in accordance to an embodiment of the invention. According to the method, at block 1002, using a packet manager of a switch in a network, a packet containing dynamic host configuration protocol (DHCP) request information is received from a network device in the network. In some embodiments, the packet is a DHCPDISCOVER packet or a DHCPREQUEST packet. In some embodiments, the packet includes an operation code that specifies the general type of the packet, a network hardware type data field that specifies the type of hardware used for a local network, a transaction identifier data field for matching a request with replies received from DHCP servers, one or more network address data fields (e.g., origin and destination addresses), a client hardware address data filed (e.g., MAC address) for identification, and/or a DHCP option data shield. For example, for the operation code, a value of 1 indicates a request message, while a value of 2 is a reply message. At block 1004, using the packet manager of the switch in the network, routing configuration and ARP configuration of the network device is obtained in response to the packet containing the DHCP request information. In some embodiments, the switch is an access switch (AS). In some embodiments, using the packet manager of the switch in the network, it is determined that the network device is located downstream to the switch in the network. In some embodiments, the network device is connected to a cloud server through the switch. In some embodiments, using the packet manager of the switch in the network, the packet containing the DHCP request information is relayed to a DHCP server. In some embodiments, the DHCP server is located in a distribution switch (DS) of the network. In some embodiments, using the packet manager of the switch in the network, an acknowledgement packet for the network device is received from the DHCP server. In some embodiments, using the packet manager of the switch in the network, a static route and a static Address Resolution Protocol (ARP) entry is configured in hardware for the network device. In some embodiments, using the packet manager of the switch in the network, a second packet containing Address Resolution Protocol (ARP) request information is received from a second network device in the network. In some embodiments, using the packet manager of the switch in the network, a static route and a static ARP entry is configured in hardware for the second network device in response to the second packet containing the ARP request information. In some embodiments, using the packet manager of the switch in the network, a static route and a static ARP entry is configured in hardware for the second network device without relaying the second packet to a DHCP server. In some embodiments, using a first thread of the packet manager, the packet containing the DHCP request information is received from the network device in the network, and using a second thread of the packet manager, the second packet containing the ARP request information is received from the second network device in the network. The switch may be similar to, the same as, or a component of the AS 356-1, 356-2, or 356-3 depicted in FIG. 3 and/or the AS 556 depicted in FIG. 5. The packet manager may be similar to, the same as, or a component of the packet manager 462 depicted in FIG. 4 and/or the packet manager 572 depicted in FIG. 5. The DS may be similar to, the same as, or a component of the DSs 352-1, 352-2 depicted in FIG. 3 and/or the DS 552 depicted in FIG. 5. The network device may be similar to, the same as, or a component of the HEs 354-1, 354-2, the wireless APs 360-1, 360-2, and/or the wireless sensors 362-1, 362-2 depicted in FIG. 3 and/or the network device 404 depicted in FIG. 4. The cloud server may be similar to, the same as, or a component of the cloud server 102 depicted in FIG. 1. The second network device may be similar to, the same as, or a component of the HEs 354-1, 354-2, the wireless APs 360-1, 360-2, and/or the wireless sensors 362-1, 362-2 depicted in FIG. 3 and/or the network device 404 depicted in FIG. 4. The network may be similar to, the same as, or a component of the network 350 depicted in FIG. 3.

Figure 11:
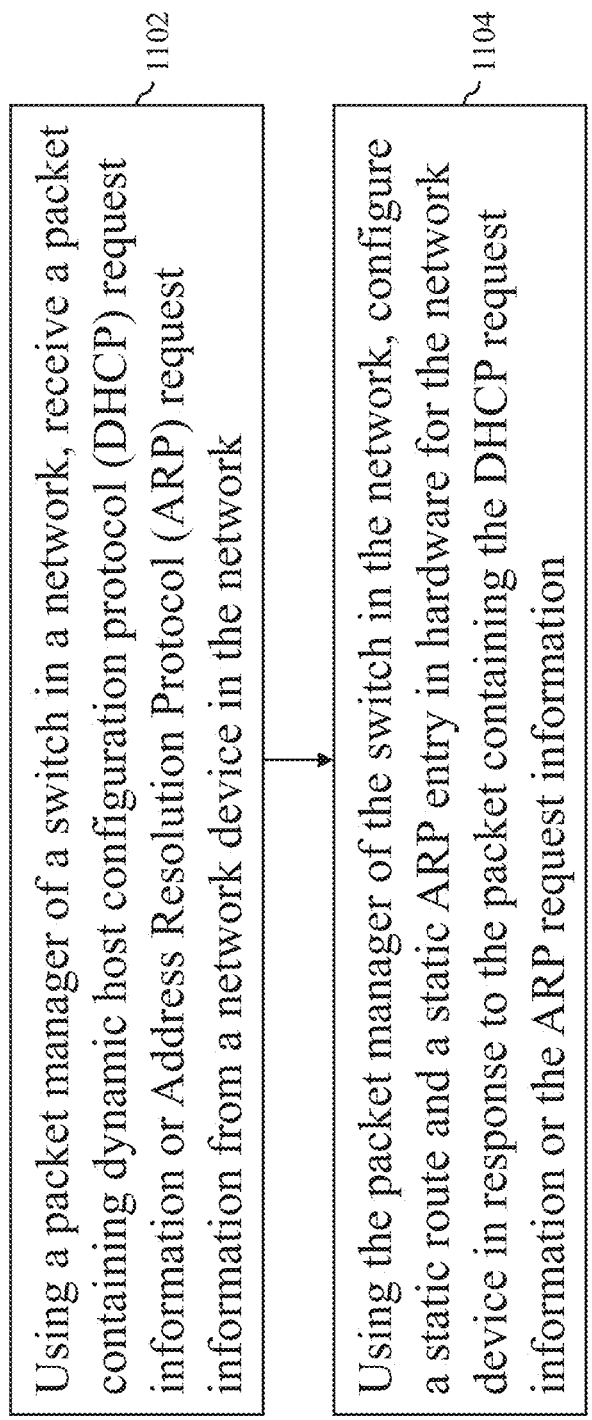
FIG. 11 is a process flow diagram of a method for automatic network service configuration in accordance to an embodiment of the invention.

FIG. 11 is a process flow diagram of a method for automatic network service configuration in accordance to an embodiment of the invention. According to the method, at block 1102, using a packet manager of a switch in a network, a packet containing DHCP request information or ARP request information is receiving from a network device in the network. At block 1104, using the packet manager of the switch in the network, a static route and a static ARP entry is configured in hardware for the network device in response to the packet containing the DHCP request information or the ARP request information. In some embodiments, the switch is an access switch (AS). In some embodiments, using the packet manager of the switch in the network, it is determined that the network device is located downstream to the switch in the network. In some embodiments, the network device is connected to a cloud server through the switch. In some embodiments, the network device is a gateway, a wireless access point, or a sensor. In some embodiments, when the packet contains the DHCP request information, using the packet manager of the switch in the network, the packet is relayed to a DHCP server. In some embodiments, the DHCP server is located in a distribution switch (DS) of the network. The switch may be similar to, the same as, or a component of the AS 356-1, 356-2, or 356-3 depicted in FIG. 3 and/or the AS 556 depicted in FIG. 5. The packet manager may be similar to, the same as, or a component of the packet manager 462 depicted in FIG. 4 and/or the packet manager 572 depicted in FIG. 5. The DS may be similar to, the same as, or a component of the DSs 352-1, 352-2 depicted in FIG. 3 and/or the DS 552 depicted in FIG. 5. The network device may be similar to, the same as, or a component of the HEs 354-1, 354-2, the wireless APs 360-1, 360-2, and/or the wireless sensors 362-1, 362-2 depicted in FIG. 3 and/or the network device 404 depicted in FIG. 4. The cloud server may be similar to, the same as, or a component of the cloud server 102 depicted in FIG. 1. The network may be similar to, the same as, or a component of the network 350 depicted in FIG. 3.

Figure 12:
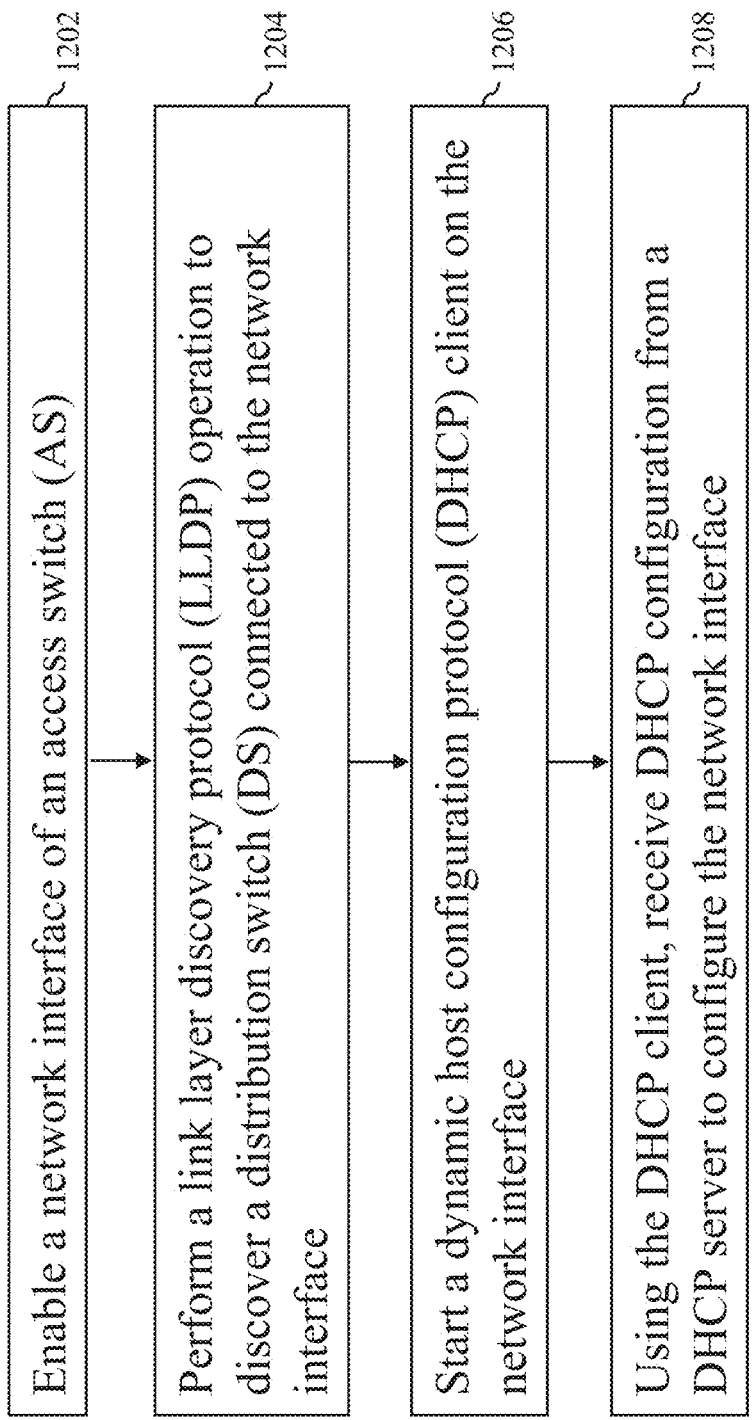
FIG. 12 is a process flow diagram of a method for automatic network service configuration in accordance to an embodiment of the invention.

FIG. 12 is a process flow diagram of a method for automatic network service configuration in accordance to an embodiment of the invention. According to the method, at block 1202, a network interface of an access switch (AS) is enabled. At block 1204, a link layer discovery protocol (LLDP) operation is performed to discover a distribution switch (DS) connected to the network interface. At block 1206, a dynamic host configuration protocol (DHCP) client is started on the network interface. At block 1208, using the DHCP client, DHCP configuration is received from a DHCP server to configure the network interface. In some embodiments, the DHCP server is located in a distribution switch (DS) of the network. The AS may be similar to, the same as, or a component of the AS 356-1, 356-2, or 356-3 depicted in FIG. 3 and/or the AS 556 depicted in FIG. 5. The DS may be similar to, the same as, or a component of the DSs 352-1, 352-2 depicted in FIG. 3 and/or the DS 552 depicted in FIG. 5. The DHCP client may be similar to, the same as, or a component of the DHCP client 570 depicted in FIG. 5. The DHCP server may be similar to, the same as, or a component of the DHCP server 560 depicted in FIG. 5.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for automatic network service configuration, the method comprising:
using a packet manager of a switch in a network, receiving a packet containing dynamic host configuration protocol (DHCP) request information from a network device in the network;
using the packet manager of the switch in the network, obtaining routing configuration and Address Resolution Protocol (ARP) configuration of the network device in response to the packet containing the DHCP request information;
using the packet manager of the switch in the network, receiving a second packet containing gratuitous ARP request information from a second network device in the network, wherein the second network device has an allocated Internet Protocol (IP) address; and
using the packet manager of the switch in the network, configuring a static route and a static ARP entry in hardware for the second network device without relaying the second packet to a DHCP server.

2. The method of claim 1, wherein the switch comprises an access switch (AS).

3. The method of claim 1, further comprising using the packet manager of the switch in the network, determining that the network device is located downstream to the switch in the network.

4. The method of claim 3, wherein the network device is connected to a cloud server through the switch.

5. The method of claim 3, further comprising using the packet manager of the switch in the network, relaying the packet containing the DHCP request information to the DHCP server.

6. The method of claim 5, wherein the DHCP server is located in a distribution switch (DS) of the network.

7. The method of claim 5, further comprising using the packet manager of the switch in the network, receiving an acknowledgement packet for the network device from the DHCP server.

8. The method of claim 7, wherein using the packet manager of the switch in the network, obtaining the routing configuration and the ARP configuration of the network device in response to the packet containing the DHCP request information comprises using the packet manager of the switch in the network, configuring a static route and a static ARP entry in hardware for the network device.

9. A method for automatic network service configuration, the method comprising:
using a packet manager of a switch in a network, receiving a packet containing dynamic host configuration protocol (DHCP) request information or Address Resolution Protocol (ARP) request information from a network device in the network;

using the packet manager of the switch in the network, configuring a static route and a static ARP entry in hardware for the network device in response to the packet containing the DHCP request information or the ARP request information;

using the packet manager of the switch in the network, receiving a second packet containing gratuitous ARP request information from a second network device in the network, wherein the second network device has an allocated Internet Protocol (IP) address; and using the packet manager of the switch in the network, configuring a second static route and a second static ARP entry in hardware for the second network device without relaying the second packet to a DHCP server.

10. The method of claim 9, wherein the switch comprises an access switch (AS).

11. The method of claim 9, further comprising using the packet manager of the switch in the network, determining that the network device is located downstream to the switch in the network.

12. The method of claim 11, wherein the network device is connected to a cloud server through the switch.

13. The method of claim 11, wherein the network device comprises a gateway, a wireless access point, or a sensor.

14. The method of claim 9, further comprising when the packet contains the DHCP request information, using the packet manager of the switch in the network, relaying the packet to the DHCP server.

15. The method of claim 14, wherein the DHCP server is located in a distribution switch (DS) of the network.

16. A method for automatic network service configuration, the method comprising:

enabling a network interface of an access switch (AS);

performing a link layer discovery protocol (LLDP) operation to discover a distribution switch (DS) connected to the network interface;

starting a dynamic host configuration protocol (DHCP) client on the network interface;

using the DHCP client, receiving DHCP configuration from a DHCP server to configure the network interface;

using a packet manager of the AS, receiving a packet containing gratuitous ARP request information from a network device, wherein the network device has an allocated Internet Protocol (IP) address; and using the packet manager of the AS, configuring a static route and a static ARP entry in hardware for the network device without relaying the packet to a DHCP server.

* * * * *